(12) United States Patent
Tomita et al.

(10) Patent No.: US 8,039,086 B2
(45) Date of Patent: *Oct. 18, 2011

(54) BONDING MATERIAL, PROCESS FOR PRODUCING THE SAME, AND HONEYCOMB STRUCTURE MADE WITH THE SAME

(75) Inventors: Takahiro Tomita, Chita (JP); Hiroki Fujita, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 292 days.

This patent is subject to a terminal disclaimer.

(21) Appl. No.: 12/138,076

(22) Filed: Jun. 12, 2008

(65) Prior Publication Data

US 2008/0248238 A1    Oct. 9, 2008

Related U.S. Application Data

(63) Continuation of application No. PCT/JP2006/324908, filed on Dec. 14, 2006.

(30) Foreign Application Priority Data

Dec. 14, 2005    (JP) .................................. 2005-360634

(51) Int. Cl.
| | |
|---|---|
| B32B 3/12 | (2006.01) |
| B01B 39/06 | (2006.01) |
| B01B 39/20 | (2006.01) |
| B01B 39/08 | (2006.01) |

(52) U.S. Cl. ............... 428/116; 55/523; 55/524; 55/525
(58) Field of Classification Search .................. None
See application file for complete search history.

(56) References Cited

U.S. PATENT DOCUMENTS

| | | | |
|---|---|---|---|
| 5,914,187 A | 6/1999 | Naruse et al. | |
| 7,138,168 B2 | 11/2006 | Fujita | |
| 2002/0197193 A1 | 12/2002 | Harada et al. | |
| 2004/0045267 A1 | 3/2004 | Ichikawa et al. | |
| 2004/0097370 A1* | 5/2004 | Ichikawa et al. | ............... 502/439 |
| 2005/0076626 A1* | 4/2005 | Kudo et al. | .................... 55/523 |
| 2005/0109023 A1 | 5/2005 | Kudo et al. | |
| 2005/0221053 A1 | 10/2005 | Tomita et al. | |
| 2005/0255288 A1 | 11/2005 | Noguchi et al. | |
| 2006/0150597 A1 | 7/2006 | Masukawa et al. | |

(Continued)

FOREIGN PATENT DOCUMENTS

EP    1-964-823 A1    9/2008

(Continued)

OTHER PUBLICATIONS

Mar. 22, 2010 Office Action issued in U.S. Appl. No. 12/239,343.

(Continued)

*Primary Examiner* — Gordon R Baldwin
(74) *Attorney, Agent, or Firm* — Oliff & Berridge, PLC (57) ABSTRACT

There is provided bonding material having a Young's Modulus after hardening of not less than 20% of articles to be bonded, and an average linear coefficient of thermal expansion after hardening of not more than 70% of the articles to be bonded. This bonding material can suppress deformation of a honeycomb segment due to thermal stress to be generated by a bonding material layer and can suitably be used at the time of manufacturing exhaust gas trapping filters capable of reducing the generation of defects such as a crack, and above all, a diesel particulate filter (DPF) for trapping particulate matter (particulates) in exhaust gas from the diesel engine.

16 Claims, 2 Drawing Sheets

U.S. PATENT DOCUMENTS

| | | |
|---|---|---|
| 2006/0228520 A1 | 10/2006 | Masukawa et al. |
| 2008/0138568 A1 | 6/2008 | Tomita et al. |

FOREIGN PATENT DOCUMENTS

| | | |
|---|---|---|
| JP | B2 3121497 | 10/2000 |
| JP | A 2001-190916 | 7/2001 |
| JP | A-2004-283669 | 10/2004 |
| JP | A 2005-154202 | 6/2005 |
| WO | WO 03/048072 A1 | 6/2003 |
| WO | WO 03/067042 A1 | 8/2003 |
| WO | WO 2007/111279 A1 | 10/2005 |

OTHER PUBLICATIONS

Sep. 17, 2010 Office Action issued in U.S. Appl. No. 12/239,343.

* cited by examiner

BONDING MATERIAL, PROCESS FOR PRODUCING THE SAME, AND HONEYCOMB STRUCTURE MADE WITH THE SAME

This is a Continuation of International Application No. PCT/JP2006/324908 filed Dec. 14, 2006, which claims the benefit of Japanese Application No. 2005-360634 filed Dec. 14, 2005. The disclosure of the prior applications is hereby incorporated by reference herein in its entirety.

TECHNICAL FIELD

The present invention relates to a ceramic structure where a plurality of ceramic members are bonded together, and in particular, it relates to a bonding material used for bonding integrally a plurality of honeycomb segments to form a honeycomb structure.

BACKGROUND ART

A honeycomb structure is built into an exhaust system of a diesel engine and the like to be used as a trapping filter for exhaust gas, for example, as a diesel particulate filter (DPF) to trap and remove particulate matter (particulates) contained in an exhaust gas from the diesel engine and the like.

Such a honeycomb structure has a structure in which a plurality of cells functioning as flow channels of fluid partitioned and formed by porous partition wall made of, for example, silicon carbide (SiC) are disposed in parallel with one another in the direction to the central axis. Further, ends of adjacent cells are alternately plugged (in a checkered pattern). That is, in one cell, one end is open, and the other end is plugged, and in another cell adjacent to this cell, one end is plugged, and the other end is open.

Because of such a structure, the exhaust gas allowed to flow into predetermined cells (inflow cells) from the end portions on one side is allowed to flow out through the adjacent cells (outflow cells) by allowing the exhaust gas to pass through the porous partition walls, and when passing the exhaust gas through the porous walls, the particulate matter (particulates) in the exhaust gas is trapped by the partition walls, so that the purification of the exhaust gas can be performed.

To continuously use such a honeycomb structure (filter) over a long period of time, a filter must be regenerated. That is, to remove an increase in pressure loss by the particulates accumulated with time inside the filter, the particulates accumulated inside the filer with time must be burnt and removed. At this regeneration time of the filter, there has been a problem that a large thermal stress is generated to cause a defect such as a crack and breakage. Complying with the request for improvement of thermal shock resistance against such a thermal stress, there has been proposed a honeycomb structure of a split structure allowed to have functions to disperse and relax the thermal stress by integrally bonding a plurality of honeycomb segments by a bonding material layer, thereby enabling it to improve the thermal shock resistance to some extent. The honeycomb structure of such a split structure is formed such that each has a shape to configure a part of the entire structure, and, at the same time, a plurality of honeycomb segments having a shape to configure the entire structure by being fitted in the direction perpendicular to the central axis are integrally bonded by the bonding material layer and are formed so as to become a predetermined shape such as a circle and the like in the entire cross-sectional shape cut along a plane perpendicular to the central axis, and after that, its outer peripheral surface is covered by a coating member.

However, in recent years, the filter has an increasing demand for a large size, and the thermal stress generated at the generation time is also increasing, and therefore, to inhibit the above described defect, the improvement of thermal shock resistance as a structure has comes to be strongly desired. Above all, the bonding material layer for integrally bonding a plurality of honeycomb segments is desired to realize a honeycomb structure excellent in thermal shock resistance by realizing an excellent stress relaxation function and bonding strength.

Addressing such a problem, a ceramic structure (honeycomb structure) has been disclosed (see Patent Document 1) in which, by adding inorganic fibers and organic binders to a sealing member (bonding material layer), generation of migration in the process of drying and hardening is suppressed, thereby controlling a development of the above described defect and aiming at the improvement in durability.

Further, there has been disclosed a honeycomb structure (use of a low Young's Modulus bonding material) satisfying either one of the conditions that the Young's Modulus of the bonding material layer between the honeycomb segments is made not more than 20% of the honeycomb segment material or that the material strength of the bonding material layer is made smaller than the material strength of the honeycomb segments (see Patent Document 2).

However, in the sealing member (bonding material layer) used for the ceramic structure (honeycomb structure) disclosed in the Patent Document 1, there has been a problem that securement of a bonding strength between the segment and bonding material layer boundary surface and securement of a stress relaxation function of the bonding material layer itself are hard to be compatible in the uniform system realized by the mutual inter-twisting of the component inorganic fibers and organic binders.

Further, though the low Young's Modulus of the bonding material forming the bonding material layer disclosed in Patent Document 2 is effective in that the thermal stress and thermal deformation generated between the honeycomb segments are relaxed, when the bonding material has high porosity due to the low Young' Modulus, there has been a problem that a bonding strength between the honeycomb segments becomes insufficient, and no sound honeycomb segment bonded body can be obtained.

Patent Document 1: JP-B-3121497
Patent Document 2: JP-A-2001-190916

DISCLOSURE OF THE INVENTION

The present invention has been made in view of the problem of the Prior Art described above, and an object of the invention is to provide a bonding material, which can form a bonding material layer of a high Young's Modulus, and attain a low expansion as well; and, therefore, the deformation of a honeycomb segment caused by generated thermal stress can be reduced by the bonding material layer, and the bonding material can suitably be used for a capturing filter for exhaust gas capable of reducing the generation of a defect such as a crack, and above all, at the fabrication time of diesel particulate filter (DPF) for trapping particulate matter (particulates) and the like in exhaust gas from a diesel engine.

To achieve the above described object, the following bonding material, manufacturing method thereof, and honeycomb structure using the same are provided according to the present invention.

[1] A bonding material whose Young's Modulus after hardening is not less than 20% of articles to be bonded matter and yet whose average linear coefficient of thermal expansion after hardening is not more than 70% of the articles to be bonded.

[2] A bonding material according to the above [1], wherein the average linear coefficient of thermal expansion is not more than $3\times10^{-6}\cdot K^{-1}$.

[3] A bonding material according to the above or [2], which is formed by a bonding material composition mainly comprising two or more fillers; one of which is a filler whose average linear coefficient of thermal expansion is not more than 50% of the articles to be bonded and other being a filler whose Young's Modulus is not less than 100 GPa, and a matrix.

[4] A bonding material according to any of the above [1] to [3], wherein the filler having a Young's Modulus of not less than 100 GPa contains flat particulates.

[5] A bonding material according to any of the above [1] to [4], wherein the average coefficient of thermal expansion of the filler having an average linear coefficient of thermal expansion of not more than 50% of the articles to be bonded is not more than $2.5\times10^{-6}\cdot K^{-1}$.

[6] A bonding material according to any one of the above [1] to [5], wherein the filler having an average linear coefficient of thermal expansion of not more than 50% of the articles to be bonded is at least one or more fillers selected from the group consisting of cordierite, beta-spodumene, amorphous silica, aluminum titanate, and zirconium phosphate.

[7] A bonding material according to any of the above [1] to [6], wherein the filler having a Young's Modulus of not less than 100 GPa is at least one or more fillers selected from the group consisting of silicon carbide, alumina, quartz, aluminum nitride, $B_4C$, mullite, SIALON, silicon nitride, zirconia, cordierite, aluminum titanate, zirconium phosphate, boron nitride, talc, mica, and glass flake.

[8] A bonding material according to the above [1] or [2], which is formed by the bonding material composition mainly comprising a filler having an average linear coefficient of thermal expansion of not more than 50% of the articles to be bonded and a Young's Modulus of not less than 100 GPa, and a matrix.

[9] A bonding material according to the above [8], wherein the filler having an average linear coefficient of thermal expansion of not more than 50% of the articles to be bonded and a Young's Modulus of not less than 100 GPa has the average coefficient of thermal expansion of not more than $2.5\times10^{6}\cdot K^{-1}$.

[10] A bonding material according to the above [8] or [9], wherein the filler having an average linear coefficient of thermal expansion of not more than 50% of the articles to be bonded and a Young's Modulus of not less than 100 GPa is at least one or more fillers selected from the group consisting of cordierite, aluminum titanate, and zirconium phosphate.

[11] A bonding material according to any of the item [1] to [10], wherein the matrix is an inorganic adhesive.

[12] A bonding material according to the above [11], wherein the inorganic adhesive is colloidal silica.

[13] A bonding material according to any of the above [1] to [12], wherein a bonding temperature with the articles to be bonded is not more than 1000° C.

[14] A bonding material according to any of the above [1] to [13], which is used for bonding honeycomb segments.

[15] A process for producing a bonding material, wherein the process includes a step of obtaining a paste-like bonding material composition by mixing and kneading a filler according to any of the above [3] to [10] and the matrix according to any of the items [3], [8], and [11] to [12].

[16] A ceramic structure manufactured by bonding a plurality of ceramic members by a bonding material according to any of the above [1] to [14].

[17] A honeycomb structure manufactured by bonding a plurality of honeycomb segments by a bonding material according to any of the above [1] to [14].

[18] A bonding material composition comprising two or more fillers and a matrix, the fillers including at least one or more fillers selected from the group consisting of cordierite, beta-spodumene, amorphous silica, aluminum titanate, and zirconium phosphate; at lease one or more fillers selected from the group consisting of silicon carbide, alumina, quartz, aluminum nitride, $B_4C$, mullite, SiAlON, silicon nitride, zirconia, cordierite, aluminum titanate, zirconium phosphate, boron nitride, talc, mica, and glass flake.

[19] A bonding material composition including at least one or more fillers and a matrix selected from the group consisting of cordierite, aluminum titanate, and zirconium phosphate.

DESCRIPTION OF REFERENCE NUMERALS

1: Honeycomb structure, 2: Honeycomb segment, 4: Coating material, 5: Cell, 6: Partition Wall, 7, Filling material, 9: Bonding material layer, 10: Honeycomb segment bonded body.

BEST MODE FOR CARRYING OUT THE INVENTION

While a bonding material of the present invention will be described in detail based on specific embodiments, the present invention is not to be construed as limited to these embodiments and can be added with various modifications, alterations, and improvements based on the knowledge of the person skilled in the art as long as they do not deviate from the scope of the present invention.

The bonding material according to the present invention has, in a bonding material integrated by two or more articles to be bonded through a bonding material layer, a Young's Modulus of the bonding material layer of not less than 20% (more preferably not less than 25% and not more than 200%) of the articles to be bonded, and moreover, the average linear coefficient of thermal expansion is not more than 70% (more preferably not less than 1% and not more than 65%) of the articles to be bonded.

As a result, the bonding material of the present invention is different in the point that, as compared with the conventional bonding material (for example, see Patent Document 2) which relaxes the thermal stress and thermal deformation generated between the honeycomb segments by lowering the Young's Modulus, it suppresses the thermal stress and thermal deformation generated between the honeycomb segments by raising the Young's Modulus initially and, at the same time, can secure a sufficient bonding strength between the honeycomb segments. This enables to obtain a sound honeycomb segment bonded body and can ultimately contribute to the improvement in productivity and quality of the honeycomb structure.

Further, the bonding material of the present invention may preferably set the average linear coefficient of thermal expansion not more than $3 \times 10^{-6} \cdot K^{-1}$ (more preferably not more than $2.5 \times 10^{-6} \cdot K^{-1}$ (still more preferably not less than $0.1 \times 10^{-6} \cdot K^{-1}$ and not more than $2.0 \times 10^{-6} \cdot K^{-1}$). This is because, the smaller the coefficient of thermal expansion is, the easier it is to control the thermal stress and thermal deformation generated between the honeycomb segments.

Incidentally, the bonding material of the present invention mainly contains the filler and the matrix and can be obtained by hardening the bonding material composition containing an additive such as an organic binder and water. A ratio of the filler occupied in the bonding material composition is preferably 10 to 95% by volume (and more preferably 20 to 90% by volume), and a ratio of the matrix is preferably 5 to 90% by volume (and more preferably 10 to 80% by volume).

Further, the bonding material of the present invention may be obtained from the bonding material composition mainly comprising two or more fillers and matrix, the fillers including a filler (hereinafter, referred to as filler (1)) whose average linear coefficient of thermal expansion is not more than 50% of the bonded matter and a filler whose Young's Modulus is not less than 100 GPa (hereinafter, referred to as filler (2)).

A volume fraction of the fillers in the bonding material composition in thus obtained bonding material of the present invention is preferably the filler (1): the filler (2) 5:95 to 95:5 (and more preferably 10:90 to 90:10).

Further, the bonding material of the present invention is preferably be obtained from the bonding material composition mainly constituted by the filler (hereinafter, referred to as filler (3)) having an average linear coefficient of thermal expansion of not more than 50% of the articles to be bonded and having a Young's Modulus of not less than 100 GPa and the matrix.

At this time, the filler (1) and the filler (3) of the bonding material of the present invention preferably have the average linear coefficient of thermal expansion of not more than $2.5 \times 10^{-6} \cdot K^{-1}$ (more preferably not more than $2.0 \times 10^{-6} \cdot K^{-1}$, and furthermore preferably not less than $0.01 \times 10^{-6} \cdot K^{-1}$ and not more than $1.5 \times 10^{-6} \cdot K^{-1}$). This is because the characteristic of the materials (filler and matrix) configuring the bonding material are reflected on the characteristics of the bonding material, and in order to set the average linear coefficient of thermal expansion of the bonding material not more than $3 \times 10^{-6} \cdot K^{-1}$, the average linear coefficient of thermal expansion of the fillers is required to be set to the value little lower than that, which is not more than $2.5 \times 10^{-6} \cdot K^{-1}$.

Here, the filler (1) used in the present invention is preferably at least one or more fillers (more preferably about one or two fillers) selected from the group consisting of cordierite, beta-spodumene, amorphous silica, aluminum titanate, and zirconium phosphate.

The filler (2) used in the present invention is preferably at least one or more fillers selected from the group consisting of silicon carbide, alumina, quartz, aluminum nitride, $B_4C$, mullite, SIALON, silicon nitride, zirconia, cordierite, aluminum titanate, zirconium phosphate, boron nitride, talc, mica, and glass flake. In particular, the filler (2) used in the present invention, by allowing flat particles such as boron nitride, talc, mica, and glass flake to be included, can improve mechanical characteristics in the bonding material (bonding material composition after hardening) of the present invention.

Further, the filler (3) used in the present invention is preferably at least one or more fillers selected from the group consisting of cordierite, aluminum titanate, and zirconium phosphate. Consequently, specifically, the bonding material composition configuring the bonding material of the present invention preferably contains two or more fillers and a matrix, the fillers including at least one or more fillers selected from the group consisting of cordierite, beta-spodumene, amorphous silica, aluminum titanate, and zirconium phosphate and at least one or more fillers selected from the group consisting of silicon carbide, aluminum, quartz, aluminum nitride, $B_4C$, mullite, SiAlON, silicon nitride, zirconia, cordierite, aluminum titanate, zirconium phosphate, boron nitride, talc, mica, and glass flak or preferably contains at least one or more fillers selected from the group consisting of cordierite, aluminum titanate, and zirconium phosphate and a matrix.

Incidentally, the shapes of the fillers (1) to (3) used in the present invention are not particularly limited, and a spherical shape, flat shape, irregular shape such as crushed matter, fibrous shape, needle-like shape, or the like may be employed, but in view of the costs involved, the shape is preferably irregular such as crushed matter, and, in view of the strength of the bonding material after hardening, the shape is preferably a shape high in aspect ratio such as a flat shape, needle-like shape, fibrous shape, and the like, and is more preferably a flat shape, taking the health effects into consideration. Further, the average size of the fillers (1) to (3) used in the present invention is preferably not less than 0.01 μm and not more than 100 μm, and their particle size distribution may be a normal distribution or a distribution in which two or more normal distributions exist.

The matrix used in the present invention is preferably an inorganic adhesive since it is necessary to moderately bond the filler particulates together and the article to be bonded and the filler. As such a bonding agent, colloidal silica, colloidal aluminum, ethyl silicate, water glass, silica polymer, aluminum phosphate, bentonite, and the like can be employed, and colloidal silica is particularly preferable. This is because it is excellent in adhesive force, adaptability to the filler, chemical stability, heat resistance, and the like.

Next, a process for producing the bonding material of the present invention is described below. The filler (1) and the filler (2) or the filler (3) are mixed, and in some cases an organic binder (for example, methyl cellulose (MC), carboxy methyl cellulose (CMC), and the like), resin balloon, and dispersing agent are added, and moreover, as the matrix, an inorganic adhesive (for example, colloidal silica), and in some cases water are mixed, and they are kneaded by a mixer for a predetermined period to manufacture a paste-like bonding material composition.

Further, when the articles to be bonded are bonded together by using the bonding material of the present invention, it is desirable from the viewpoint of being able to exhibit sufficient strength and bonding state that the bonding temperature with the articles to be bonded is preferably not more than 1000° C. (and preferably not less than 50° C. and not more than 900° C., and more preferably not less than 100° C. and not more than 800° C.). Even when the temperature exceeds 1000° C., the bonding can be made without any problem, but desired characteristics (Young's Modulus, coefficient of thermal expansion, and the like) are difficult to obtain, which is not preferable.

Next, one example of the structure of the honeycomb structure to which the bonding material of the present invention is applied will be described.

Figure 1:
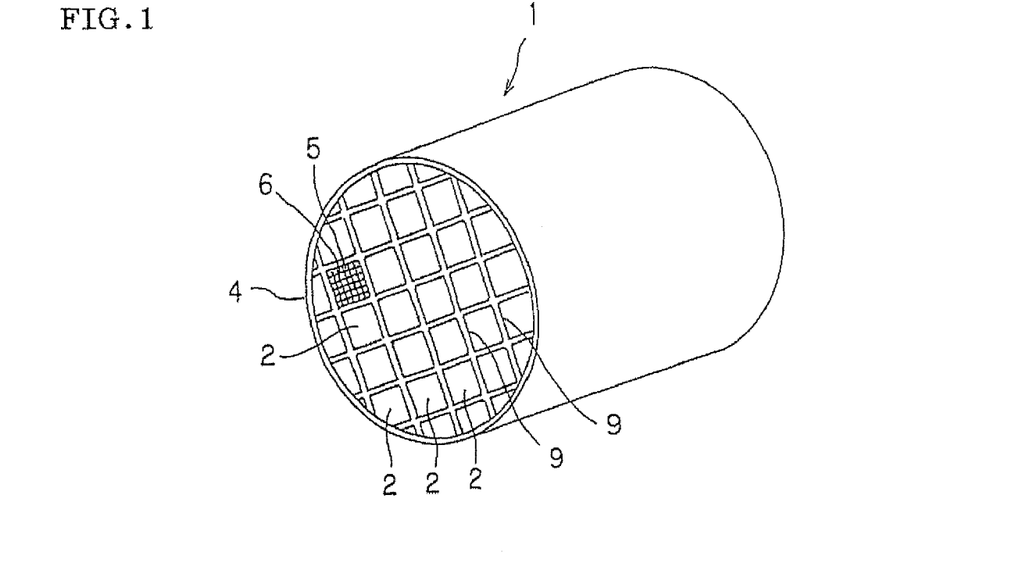
FIG. 1 is a perspective view schematically showing one embodiment (the entire cross-sectional shape cut along a plane perpendicular to the central axis is circular) of a honeycomb structure of the present invention.
Figure 2:
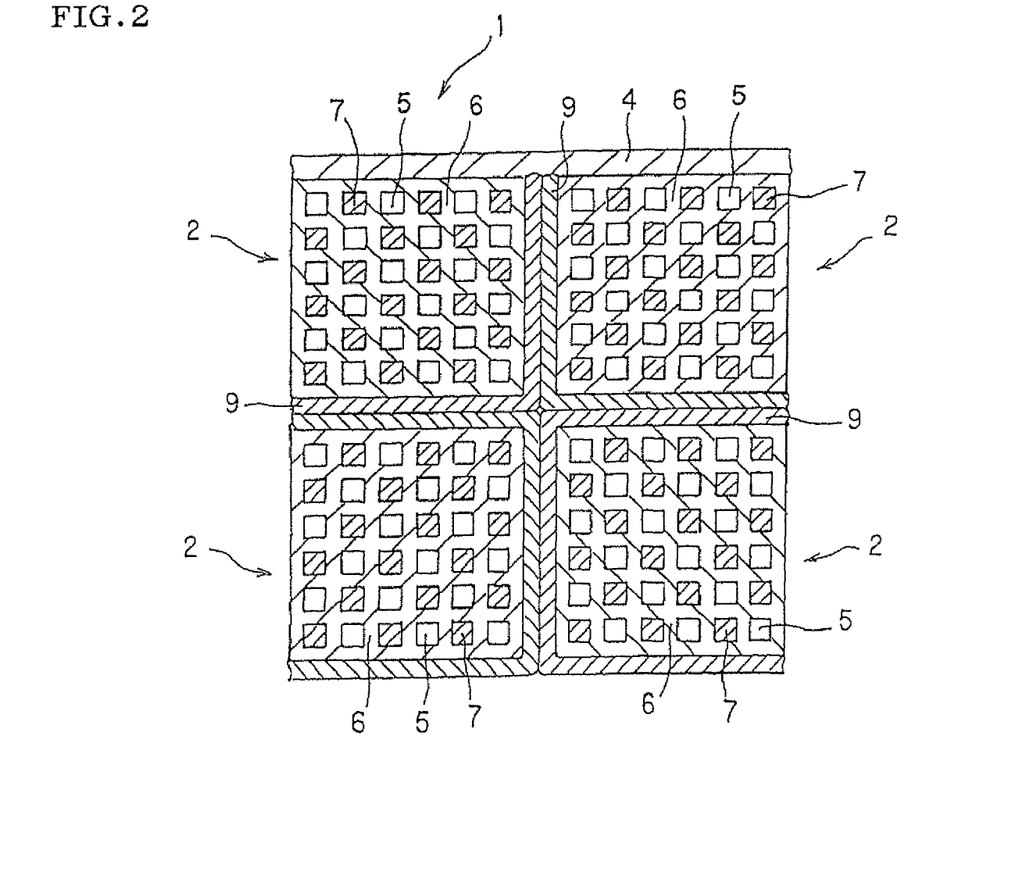
FIG. 2 is a front view of a part of another embodiment (the entire cross-sectional shape cut along a plane vertical to the central axis is squire) of the honeycomb structure of the present invention seen from the end surface side.

A honeycomb structure 1 of the present invention, as shown in FIGS. 1 and 2, is structured such that a plurality of cells 5 functioning as the flow channels of fluid partitioned and formed by porous partition walls 6 are disposed so as to be mutually in parallel in the direction to the central axis of the honeycomb structure 1, and each cell has a shape configuring a part of the entire structure. At the same time, a plurality of honeycomb segments 2 having a shape destined to configure the entire structure by being fitted in the direction perpendicular to the central axis of the honeycomb structure 1 are configured as honeycomb segment bonded body 10 integrally bonded by bonding material layers 9 formed by the bonding material of the present invention.

Here, after bonding the honeycomb segments 2 by the bonding material layers 9, the entire cross-sectional shape cut along a plane perpendicular to the central axis of the honeycomb structure 1 is ground so as to become a circle, an oval, a triangle, a square, or other shapes, and the outer peripheral surface is coated with a coating material 4. When this honeycomb structure 1 is used as a DPF, it is placed in the exhaust gas system or the like of a diesel engine, so that it can trap particulate matter (particulates) containing soot exhausted from the diesel engine.

Figure 3:
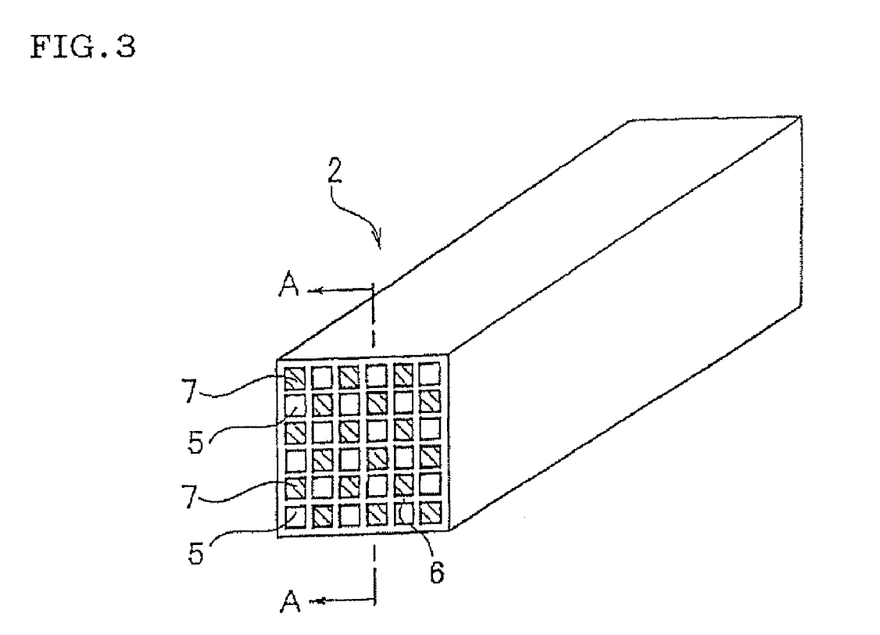
FIG. 3 is a perspective view schematically showing a honeycomb segment used for another embodiment of the honeycomb structure of the present invention.
Figure 4:
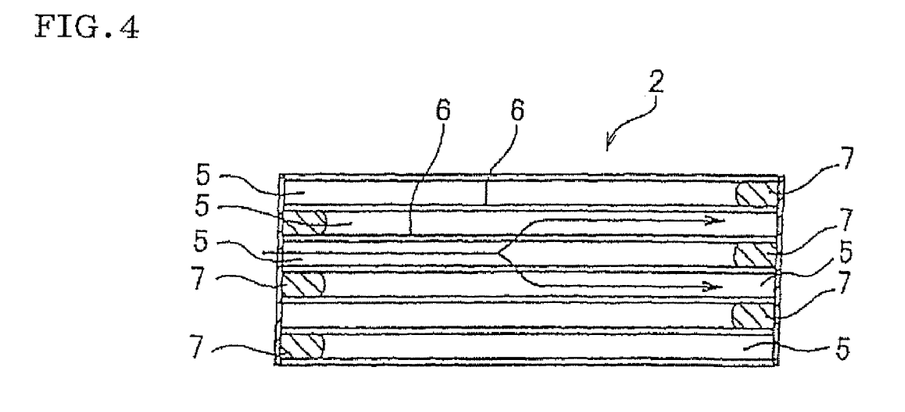
FIG. 4 is a sectional view cut along the line A-A in FIG. 3.

Further, in FIG. 1, only in one honeycomb segment 2, cells 5 and partition walls 6 are shown. Each honeycomb segment 2, as shown in FIGS. 3 and 4, has a shape to configure a part of the entire structure of the honeycomb structure 1 (honeycomb segment bonded body 10) (see FIG. 1) and, at the same time, is fitted in the direction perpendicular to the central axis of the honeycomb structure 1 (see FIG. 1) so as to configure the entire structure. The cells 5 are disposed to be mutually in parallel in the direction to the central axis of the honeycomb structure 1, and each end in the adjacent cells 5 is alternately sealed by a filler 7.

In a predetermined cell 5 (inflow cell), the left end side in FIGS. 3 and 4 is open, whereas the right end side is plugged with the filler 7, and in the other cell 5 (outflow cell) adjacent to this cell, the left end side is plugged with the filler 7, whereas the right end side is open. By such a plugging, as shown in FIG. 2, the end surface of the honeycomb segment 2 exhibits a checkered pattern. When such a honeycomb structure 1 having a plurality of honeycomb segments 2 bonded together is placed inside the exhaust gas system, exhaust gas flows into the cells 5 of each honeycomb segment 2 from the left side in FIG. 4 and moves to the right side.

In FIG. 4, a case is shown, where the left side of the honeycomb segment 2 is an inlet of exhaust gas. The exhaust gas flows into the honeycomb segment 2 from the cells 5 (inflow cells) which is open without being plugged. The exhaust gas flowed into the cells 5 (inflow cells) passes through the porous partition walls 6 and flows out from the other cells 5 (outflow cells). When passing through the partition walls 6, the particulate matter (particulates) containing soot in the exhaust gas are trapped by the partition walls 6. Thus, the purification of the exhaust gas can be performed. By such trapping, the particulate matter (particulates) containing soot is accumulated inside the honeycomb segment 2 with time, thereby increasing a pressure loss, and thus the regeneration where the soot and the like is burnt is performed. Incidentally, while FIGS. 2 to 4 show the honeycomb segments 2 whose entire cross-sectional shape is square, the shape may be triangle, hexagon, or the like. Further, the cross-sectional shape of the cells 5 may also be a triangle, hexagon, circle, oval, or other shapes.

As shown in FIG. 2, a bonding material layer 9 is formed by the bonding material of the present invention and is coated on the outer periphery of the honeycomb segments 2 and functions to bonding the honeycomb segments 2. While the coating of the bonding material layer 9 may be performed on the outer peripheral surfaces of the honeycomb segments 2 mutually abutting on each other between the mutually adjacent honeycomb segments 2, the coating may be performed only on one of the corresponding outer peripheral surfaces between the mutually adjacent honeycomb segments 2. Such coating on only one side of the corresponding surfaces is preferable in that the quantity consumed of the bonding material layer 9 can be saved. The thickness of the bonding material layer 9 is determined in consideration of the bonding force between the honeycomb segments 2 and is suitably selected in the range of, for example, 0.5 to 3.0 mm.

As a material of the honeycomb segment 2 used in the present embodiment, in view of strength and heat resistance, there may be employed the material constituted of at least one selected from the group consisting of silicon carbide (SiC), silicon-silicon carbide based compound material formed with silicon carbide (SiC) as a framework, and moreover, formed with silicon (Si) as a binding material, silicon nitride, cordierite, mullite, alumina, spinel, silicon carbide-cordierite based compound material, silicon-silicon carbide compound, lithium aluminum silicate, aluminum titanate, and Fe—Cr-Al based metal. Above all, the material comprising silicon carbide (SiC) or silicon-silicon carbide based compound material is preferable.

The manufacture of the honeycomb segment 2 can be performed such that, for example, to the material properly selected from the above described materials are added a binder such as methyl cellulose, hydroxypropoxyl cellulose, hydroxyethyl cellulose, carboxymethyl cellulose, and polyvinylalcohol, surface active agent, and water as a solvent to obtain clay having plasticity, and this clay is subjected to exclusion forming so as to become the above described shape, and subsequently, drying a formed clay by microwave, hot air, and the like, and after that, it is sintered.

As the filler 7 used for plugging the cells 5, the material same as that for the honeycomb segment 2 can be used. The plugging by the filler 7 can be performed such that the end surface of the honeycomb segment 2 is immersed into the slurried filler 7 in a state that the cells 5 not plugged is masked to fill the filler 7 into the open cells 5. The filling of the filler 7 may be performed before firing after forming the honeycomb segment 2 or may be performed after firing, but performed before firing is preferable because a firing process is required only once.

After manufacturing the honeycomb segment 2 as described above, a paste-like bonding member composition is coated on the outer peripheral surface of the honeycomb segments 2 to form the bonding member layers 9 and a plurality of honeycomb segments 2 are joined together so as to become a predetermined three-dimensional shape (the entire structure of the honeycomb structure 1), and in this joined state, the honeycomb segments are compressed, followed by heating and drying. In this manner, a bonded body where a plurality of honeycomb segments 2 is integrally bonded is manufactured. After that, this bonded body is ground to obtain the above described shape, and the outer peripheral surface thereof is coated with the coating material 4 and is heated and dried. In this manner, the honeycomb structure 1 as shown in FIG. 1 is manufactured. As the material of the coating material 4, the material same as the bonding material layer 9 can be used. The thickness of the coating material 4 can properly be selected, for example, in the range of 0.1 to 5 mm.

EXAMPLES

Now, the present invention will be described in further detail with reference to Examples. However, the present invention is by no means limited to these Examples.

Example 1

Manufacture of Honeycomb Segment

As a raw material of the honeycomb segment, SiC powder and metal Si powder were mixed at the mass ratio of 80:20, and to this mixed powder were added a pore formed material, an organic binder, a surface active agent, and water to prepare clay having plasticity. This kneaded clay was subjected to extrusion forming and the formed article was dried, so that a honeycomb segment dried article having a partition wall thickness of 310 μm, a cell density of approximately 46.5 cells/cm$^2$ (300 cells/square inch), a regular square of 35 mm in one side of the cross-section, and a length of 152 mm was obtained. This honeycomb segment formed body was plugged at both end surfaces so that the end surface exhibits checkered patterns. That is, the adjacent cells were plugged so as to be mutually plugged at the ends of opposite sides. As the plugging material, the material similar to the honeycomb segment raw material was used. The honeycomb segment formed bodies were plugged at both end surfaces and dried, followed by degreasing at about 400° C. in the ambient atmosphere, and after that, were fired in an argon inert atmosphere at approximately 1450° C., thereby obtaining honeycomb segments having a porous structure with SiC crystal grains bonded by Si.

(Preparation of Bonding Material Composition)

Under the conditions shown in Table 1, to a mixture of a filler A and/or a filler B were added a dispersant, a resin balloon, and an organic binder (CMC), and there was further mixed colloidal silica as a matrix, and the mixture was kneaded by a mixer for 30 minutes, thereby obtaining paste-like bonding material compositions (bonding material compositions No. 1 to 13), respectively which are different in the kind and the ratio of composition. Incidentally, the ratio of all the fillers in the bonding material composition is a total of the fillers A and B of the column [the filler volume fraction in the bonding material composition]. For example, in the case of the bonding material composition No. 1, its volume fraction is 50%, and further, the ratio of the matrix in the bonding material composition was obtained by deducting a total of the fillers A and B of the column [the filler volume fraction in the bonding material composition] of Table 1 from 100. For example, in the case of the bonding material composition No. 1, a ratio of the matrix is 50%. Further, in the column of [others] of Table 1, a dispersant, a resin balloon, and an organic binder were added as super additions with respect to a total of all the fillers and matrix.

(Manufacture of Honeycomb Structure)

The steps of coating an external wall surface of the honeycomb segment with the bonding material composition No. 1 so as to form a bonding material layer of approximately 1 mm in thickness and mounting another honeycomb segment on the layer were repeated, and a honeycomb segment laminate composed of 16 pieces of honeycomb segments combined four by four was manufactured, and by suitably applying pressure from outside, the entirety was bonded, and after that, it was dried at 140° C. for two hours, thereby a honeycomb segment bonded body was obtained. The outer periphery of the obtained honeycomb segment bonded body was cut into a cylindrical shape, and after that, the outer peripheral surface was coated with a coating material and was dried and hardened at 700° C. for two hours to obtain a honeycomb structure.

(Evaluation of Bonding Material Layer (Bonding Material Composition after Hardening))

The Young's Modulus, the average coefficient of thermal expansion, and the porosity of the bonding material portion (bonding material composition after hardening) in the obtained honeycomb structure were measured by cutting out a bonding material portion of the honeycomb structure to obtain a sample of a predetermined shape and measuring the sample for the Young's Modulus by a load-displacement curve in a three point bending test according to JIS R1601, the average linear coefficient of thermal expansion according to JIS R1618, and the porosity by Archimedes method, respectively. The result thereof is shown in Table 2.

(Evaluation of Honeycomb Bonded Body)

The bonding state test, rapid heating test (Burner Spalling Test B-sp), rapid cooling test (Electric Furnace Spalling Test E-sp), and engine test (E/G test) of the obtained honeycomb structure were conducted, respectively. The results are shown in Table 2.

(1) Bonding State

The state of the bonded portion after bonding and hardening was visually observed, and at the same time, bonding strength was observed by hand sense. Incidentally, in the presentation of Table 2, the case of ○ means a solid bonding state in which neither a defect nor a crack exists, and the case of X means a bonding state to the extent of simply peeling off or coming off or a state in which crack and defect exist in plenty.

(2) [B-sp] Test [Burner-Spalling Test (Rapid-Heating Test)]

This is a test in which the air heated by a burner is sent into the honeycomb structure, whereby a temperature difference is created between the center portion and the outside portion, and a resistance to thermal shock is evaluated by the temperature not generating a crack in the honeycomb structure (the higher the temperature is, the higher the resistance to thermal shock is). Incidentally, in the representation of Table 2, the case of ○ means no generation of a crack, and the case of x means generation of a crack.

(3) [E-sp] Test [Electric Furnace Spalling Test (Rapid Cooling Test)]

This is a test in which the honeycomb structure is heated by an electric furnace at 550° C. for two hours to have a uniform temperature (450° C.), and after that it is taken out at room temperature, and then the resistance to thermal shock is estimated depending on the presence or absence of the generation of a crack in the honeycomb structure. Incidentally, in the representation of Table 2, the case of ○ means generation of no crack, and the case of x means generation of a crack.

(4) [E/G] Test [Engine Test at 1000° C.]

This is a test in which the particulates accumulated for regenerating of the filter are burnt, and under the condition in which the temperature of the honeycomb center portion is 1000° C., the resistance to thermal shock is estimated depending on the presence or absence of the crack in the honeycomb structure. Incidentally, in the representation of Table 2, the case of ○ means generation of no crack, and the case of x means generation of a crack.

Examples 2 to 11 and Comparative Examples 1 and 2

In Examples 2 to 11, honeycomb structures were manufactured in the same manner as in Example 1 except that the bonding material in Example 1 was changed to the bonding material compositions Nos. 2 to 11, respectively, shown in Table 1. Further, in Comparison Examples 1 and 2, honeycomb structures were manufactured in the same manner as in Example 1 except that the bonding material composition in Example 1 was changed to Nos. 12 and 13, respectively. Evaluation and Test were conducted in the same manner as in Example 1 on each of the obtained honeycomb structures (Examples 2 to 11 and Comparative Examples 1 and 2). The results are shown in Table 1.

TABLE 1

| No of bonding material composition | Filler's type | Matrix's type | Filler's Young's modulus (GPa) | Filler's average linear thermal expansion co-efficient ($\times 10^{-6} K^{-1}$) | Average linear thermal expansion coefficient ratio between filler & bonding material | Filler's volume friction in bonding material (%) | Others (mass %) |
|---|---|---|---|---|---|---|---|
| 1 | A: SiC<br>B: Cordierite | Colloidal silica | A: 400<br>B: 100 | A: 4.5<br>B: 1.2 | A: 100<br>B: 27 | A: 25<br>B: 25 | Dispersant: 0.15<br>Resin balloon: 0.5<br>Organic binder: 0.1 |
| 2 | A: SiC<br>B: Cordierite | Colloidal silica | A: 400<br>B: 100 | A: 4.5<br>B: 1.2 | A: 100<br>B: 27 | A: 25<br>B: 25 | Dispersant: 0.15<br>Organic binder: 0.1 |
| 3 | A: SiC<br>B: Amorphous silica | Colloidal silica | A: 400<br>B: 60 | A: 4.5<br>S: 1.1 | A: 100<br>B: 24 | A: 25<br>B: 25 | Dispersant: 0.15<br>Resin balloon: 0.5<br>Organic binder: 0.1 |
| 4 | A: SiC<br>B: Aluminum titanate | Colloidal silica | A: 400<br>B: 120 | A: 4.5<br>B: 2.0 | A: 100<br>B: 50 | A: 25<br>B: 25 | Dispersant: 0.15<br>Resin balloon: 0.5<br>Organic binder: 0.1 |
| 5 | A: SiC<br>B: Zirconium phosphate | Colloidal silica | A: 400<br>B: 130 | A: 4.5<br>B: 1.8 | A: 100<br>B: 40 | A: 25<br>B: 25 | Dispersant: 0.15<br>Resin balloon: 0.5<br>Organic binder: 0.1 |
| 6 | A: Alumina<br>B: Cordierite | Colloidal silica | A: 300<br>B: 100 | A: 8<br>B: 1.2 | A: 180<br>B: 27 | A: 15<br>B: 35 | Dispersant: 0.15<br>Resin balloon: 0.5<br>Organic binder: 0.1 |
| 7 | A: Quartz<br>B: Cordierite | Colloidal silica | A: 250<br>B: 100 | A: 10<br>B: 1.2 | A: 220<br>B: 27 | A: 10<br>B: 40 | Dispersant: 0.15<br>Resin balloon: 0.5<br>Organic binder: 0.1 |
| 8 | A: None<br>B: Cordierite | Colloidal silica | A: —<br>B: 150 | A: —<br>B: 1.2 | A: —<br>B: 27 | A: —<br>B: 50 | Dispersant: 0.15<br>Resin balloon: 0.5<br>Organic binder: 0.1 |
| 9 | A1: Mica<br>B: Cordierite | Colloidal silica | A: 180<br>B: 100 | A: 9.3<br>B: 1.2 | A: 200<br>8: 27 | A: 5<br>B: 45 | Dispersant: 0.15<br>Resin balloon: 0.5<br>Organic binder: 0.1 |
| 10 | A: Talc<br>B: Cordierite | Colloidal silica | A: 170<br>B: 100 | A: 7.8<br>B: 1.2 | A: 170<br>B: 27 | A: 5<br>B: 45 | Dispersant: 0.15<br>Resin balloon: 0.5<br>Organic binder: 0.1 |
| 11 | A1: SiC<br>A2: Talc<br>B: Cordierite | Colloidal silica | A1: 400<br>A2: 170<br>B: 100 | A1: 4.5<br>A2: 7.8<br>B: 1.2 | A1: 100<br>A2: 170<br>B: 27 | A1: 24<br>A2: 1<br>B: 25 | Dispersant: 0.15<br>Resin balloon: 0.5<br>Organic binder: 0.1 |
| 12 | A: SiC<br>B: None | Colloidal silica | A: 400<br>B: — | A: 4.5<br>B: — | A: 100<br>B: — | A: 50<br>B: — | Dispersant: 0.15<br>Resin balloon: 0.5<br>Organic binder: 0.1 |
| 13 | A: None<br>B: Cordierite | Colloidal silica | A: —<br>B: 150 | A: —<br>B: 1.2 | A: —<br>B: 27 | A: —<br>B: 50 | Dispersant: 0.15<br>Resin balloon: 5<br>Organic binder: 0.1 |

TABLE 2

| | No of bonding material composition | Ratio of Young's modulus between bonding material and material to be bonded (%) | Average linear thermal expansion coefficient ratio between bonding material and material to be bonded (%) | Bonding material's average linear thermal expansion coefficient ($\times 10^{-6} K^{-1}$) | Porosity of bonding material (%) | Bonding state | B-sp test (° C.) | E-sp test | E/G test |
|---|---|---|---|---|---|---|---|---|---|
| Example 1 | 1 | 67 | 44 | 2 | 42 | ○ | 1000 | ○ | ○ |
| Example 2 | 2 | 75 | 44 | 2 | 43 | ○ | 900 | ○ | ○ |
| Example 3 | 3 | 63 | 40 | 1.8 | 40 | ○ | 800 | ○ | ○ |
| Example 4 | 4 | 67 | 50 | 2.2 | 42 | ○ | 700 | ○ | ○ |
| Example 5 | 5 | 70 | 50 | 2.3 | 41 | ○ | 800 | ○ | ○ |
| Example 6 | 6 | 58 | 50 | 2.3 | 39 | ○ | 700 | ○ | ○ |
| Example 7 | 7 | 25 | 55 | 2.5 | 38 | ○ | 700 | ○ | ○ |
| Example 8 | 8 | 40 | 33 | 1.5 | 44 | ○ | 600 | ○ | ○ |
| Example 9 | 9 | 45 | 60 | 2.7 | 45 | ○ | 800 | ○ | ○ |
| Example 10 | 10 | 43 | 60 | 2.7 | 42 | ○ | 900 | ○ | ○ |
| Example 11 | 11 | 64 | 64 | 2.9 | 38 | ○ | 700 | ○ | ○ |
| Comparison Example 1 | 12 | 80 | 90 | 4 | 43 | ○ | 500 | x | x |
| Comparison Example 2 | 13 | 2 | 33 | 1.5 | 87 | x | No Test Possible | No Test Possible | No Test Possible |

DISCUSSION

Examples 1-11 and Comparative Examples 1 and 2

From the results of Table 2, in Examples 1 to 11, Young's Modulus of the bonding material is not less than 20% of the article to be bonded in, and the average linear coefficient of thermal expansion of the bonding material is not more than 70% of the articles to be bonded, and, therefore, no crack was observed in the honeycomb structure after the tests of various types were conducted.

On the other hand, since in Comparative Example 1, the linear coefficient of thermal expansion of the bonding material/linear coefficient of thermal expansion of the articles to be bonded is more than 70%, cracks were generated after the tests of various types were conducted. Further, in Comparative Example 2, the bonding state was bad since the Young's Modulus of the bonding material/the Young's Modulus of the articles to be bonded was below 20%, and test pieces to be supplied to the subsequent tests were not manufactured.

INDUSTRIAL APPLICABILITY

The bonding material of the present invention can suitably be used at the time of manufacturing exhaust gas trapping filters, above all, a diesel particulate filter (DPF) for trapping the particulate matter (particulates) in the exhaust gas of the diesel engine.

The invention claimed is:

1. A bonding material composition comprising two or more fillers and a matrix, the fillers including:
   at least one or more fillers selected from the group consisting of cordierite, beta-spodumene, amorphous silica, aluminum titanate, and zirconium phosphate;
   at least one or more fillers selected from the group consisting of silicon carbide, alumina, quartz, aluminum nitride, $B_4C$, mullite, SiAlON, silicon nitride, zirconia, cordierite, aluminum titanate, zirconium phosphate, boron nitride, talc, mica, and glass flake,
   wherein the fillers are 10-95% by volume of the bonding material composition, the matrix is 5-90% by volume of the bonding material, and a volume ratio of a first filler of the two or more fillers to a second filler of the two or more fillers is 5:95 to 95:5; and
   at least one of the fillers and the matrix is selected so as to have a Young's Modulus after hardening not less than 20% of that of articles to be bonded, and an average linear coefficient of thermal expansion after hardening not more than 70% of that of the articles to be bonded.

2. The bonding material composition according to claim 1, including:
   at least one or more fillers selected from the group consisting of cordierite, aluminum titanate and zirconium phosphate, and
   a matrix.

3. A bonding material having the bonding material composition according to claim 1.

4. The bonding material according to claim 3, wherein said average linear coefficient of thermal expansion is not more than $3 \times 10^{-6} \cdot K^{-1}$.

5. The bonding material according to claim 3, wherein the first filler has an average linear coefficient of thermal expansion of not more than 50% of the articles to be bonded; and the second filler has a Young's Modulus of not less than 100 GPa.

6. The bonding material according to claim 5, wherein the second filler contains flat particles.

7. The bonding material according to claim 5, wherein the average coefficient of thermal expansion of the first filler is not more than $2.5 \times 10^{-6} \cdot K^{-1}$.

8. The bonding material according to claim 3, wherein the two or more fillers have an average coefficient of thermal expansion of not more than $2.5 \times 10^{-6} \cdot K^{-1}$.

9. The bonding material according to claim 3, wherein the two or more fillers are selected from the group consisting of cordierite, aluminum titanate, and zirconium phosphate.

10. The bonding material according to claim 3, wherein said matrix is an inorganic adhesive.

11. The bonding material according to claim 10, wherein said inorganic adhesive is colloidal silica.

12. The bonding material according to claim 3, wherein a bonding temperature with the articles to be bonded is not more than 1000° C.

13. The bonding material according to claim 3, wherein the articles to be bonded are honeycomb segments.

14. A process for producing a bonding material, wherein the process includes a step of obtaining a paste-like bonding material composition by mixing and kneading a filler and a matrix according to claim 1.

15. A ceramic structure manufactured by bonding a plurality of ceramic members by a bonding material according to claim 3.

16. A honeycomb structure manufactured by bonding a plurality of honeycomb segments by a bonding material according to claim 3.

\* \* \* \* \*